United States Patent [19]

Shieh et al.

[11] Patent Number: 5,649,098

[45] Date of Patent: Jul. 15, 1997

[54] METHODS AND APPARATUS FOR DISABLING A WATCHDOG FUNCTION

[75] Inventors: Sui Ping Shieh, Los Altos; Dana William Davis, San Jose, both of Calif.

[73] Assignee: Maxim Integrated Products, Sunnyvale, Calif.

[21] Appl. No.: 557,848

[22] Filed: Nov. 14, 1995

[51] Int. Cl.$^6$ ............................ G01R 31/28; G06F 11/00
[52] U.S. Cl. .............................. 395/185.08; 371/62
[58] Field of Search ...................... 395/185.08, 185.01; 371/62

[56] References Cited

U.S. PATENT DOCUMENTS

| | | | |
|---|---|---|---|
| 4,488,303 | 12/1984 | Abramovich | 395/185.08 X |
| 4,627,060 | 12/1986 | Huang | 371/62 |
| 4,674,035 | 6/1987 | Engel | 395/185.08 X |
| 4,956,842 | 9/1990 | Said | 371/62 |
| 5,048,017 | 9/1991 | Breneman | 395/185.08 |
| 5,123,018 | 6/1992 | Peterson | 395/185.08 |
| 5,175,845 | 12/1992 | Little | 395/185.08 X |
| 5,233,613 | 8/1993 | Allen | 395/185.08 |
| 5,283,792 | 2/1994 | Davies, Jr. | 395/182.2 |
| 5,303,390 | 4/1994 | Little | 395/180 |
| 5,337,234 | 8/1994 | Anderson | 364/422 |

Primary Examiner—Robert W. Beausoliel, Jr.
Assistant Examiner—Glenn Snyder
Attorney, Agent, or Firm—Hickman Beyer & Weaver

[57] ABSTRACT

An apparatus for disabling a watchdog function of a watchdog circuit when a watchdog input pin of the watchdog circuit fails to receive an externally pulsed signal, which has a first predefined period. The watchdog circuit, while the watchdog function is enabled, generates a watchdog fault condition if the externally pulsed signal is not received at the watchdog input pin by the end of a predefined watchdog timeout period. The apparatus includes a pulse generation circuit for generating a pulsed signal having a second predefined period, the second predefined period being shorter than the watchdog timeout period. Further, the apparatus includes a drive circuit coupled to the pulse generation circuit and the watchdog input pin. The drive circuit provides an internally pulsed signal to the watchdog input pin at a predefined current level, responsive to the pulsed signal from the pulse generation circuit. This predefined current level is sufficient to pull the watchdog input pin to a potential level of the internally pulsed signal when the watchdog input pin does not receive the externally pulsed signal. Moreover, this predefined current level is incapable of pulling the conductor to the potential level of the internally pulsed signal when the watchdog input pin receives the externally pulsed signal.

17 Claims, 5 Drawing Sheets

FIG. 5A
EXTERNAL

FIG. 5B
INTERNAL

FIG. 5C
WATCHDOG
INPUT PIN

FIG. 6A  EXTERNAL

FIG. 6B
INTERNAL

FIG. 6C
WATCHDOG
INPUT PIN

FIG. 7

METHODS AND APPARATUS FOR DISABLING A WATCHDOG FUNCTION

BACKGROUND OF THE INVENTION

The present invention relates to microprocessor supervisory circuits. More particularly, the invention relates to a class of microprocessor supervisory circuits known as watchdog circuits.

Supervisory circuits are known. The function of a supervisory circuit is to ensure that the circuit being monitored by it works as expected. If the monitored circuit fails, the supervisory circuit then takes a predefined course of action to either remedy the failure, to limit the potential damage, or to simply warn. Watchdog circuits, representing a special class of supervisory circuit, are often employed to monitor software execution on a microprocessor or microcontroller (hereinafter "monitored processor"). When software-related failure on the monitored processor is detected, the watchdog circuit responds.

Figure 1:
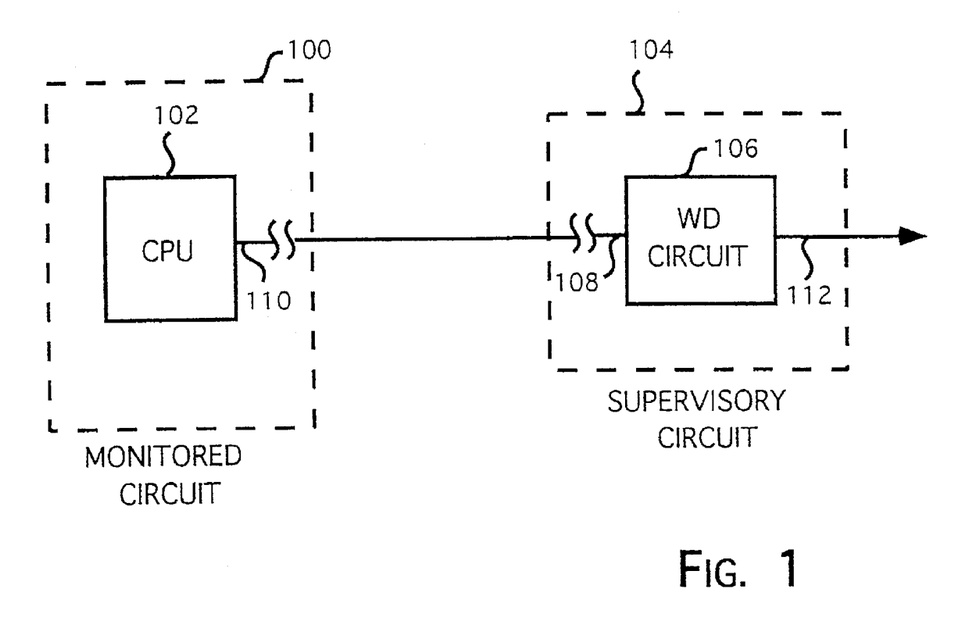
FIG. 1 shows, for illustration purposes, a simple watchdog circuit configuration.

FIG. 1 illustrates a simple watchdog circuit configuration. In FIG. 1, there is shown a monitored circuit 100, representing the circuit/system being monitored by a supervisory circuit 104. Typically, monitored circuit 100 includes one or more microprocessors or microcontrollers 102. Supervisory circuit 104 includes a watchdog circuit 106. A watchdog input pin 108 couples watchdog circuit 106 to monitored processor 102.

In operation, watchdog circuit 106 monitors software execution on monitored processor 102. Typically, programmers of the software that executes on monitored processor 102 would include in its codes commands that periodically pulse a specified OUT pin 110 on the monitored processor if the software executes properly. OUT pin 110 may represent, in one embodiment, an input/output (I/O) pin or a bus line of monitored processor 102. Since watchdog input pin 108 of watchdog circuit 106 is coupled to OUT pin 110, watchdog input pin 108 is also periodically pulsed by the externally pulsed signal that is generated when the software executing on monitored processor 102 executes properly.

Each time the watchdog input pin 108 gets pulsed, the watchdog timer within watchdog circuit 106 gets reset to zero and starts counting again, using, for example, an oscillator circuit. In the event that watchdog input pin 108 is not pulsed by the end of a predefined watchdog timeout period, e.g., when the software executing in monitored processor 102 is in an endless loop or experiences software failures, the internal watchdog timer within watchdog circuit 106 times out, thereby generating a watchdog fault condition. As long as a pulse is received before the expiration of each predefined watchdog timeout period, the watchdog fault condition is not generated.

In one embodiment, the presence of the watchdog fault condition is manifested by the assertion of a watchdog output signal on watchdog output pin 112. This watchdog output signal may then be provided to monitored processor 102 to cause, for example, a non-maskable interrupt for servicing the watchdog fault condition. The watchdog output signal may also be used to indicate that a watchdog fault condition has occurred by, for example, setting a flip-flop. The watchdog output signal may also be input into a reset circuit to reset the system being monitored, e.g., monitored circuit 100.

In some situations, it is desirable or even necessary to disable the watchdog function performed by watchdog circuit 106. For example, some software may be written without providing for commands to periodically pulse watchdog input pin 108. To avoid the continual generation of the watchdog fault condition on an otherwise operative monitored circuit, it is desirable in this case to simply disable the watchdog circuit. As a further example, monitored circuit 100 may at times be intentionally placed in a sleep mode, which effectively suspends software execution in monitored processor 102. In this case, it is undesirable to continually generate the watchdog fault condition when monitored circuit 1130 behaves as desired.

Figure 2:
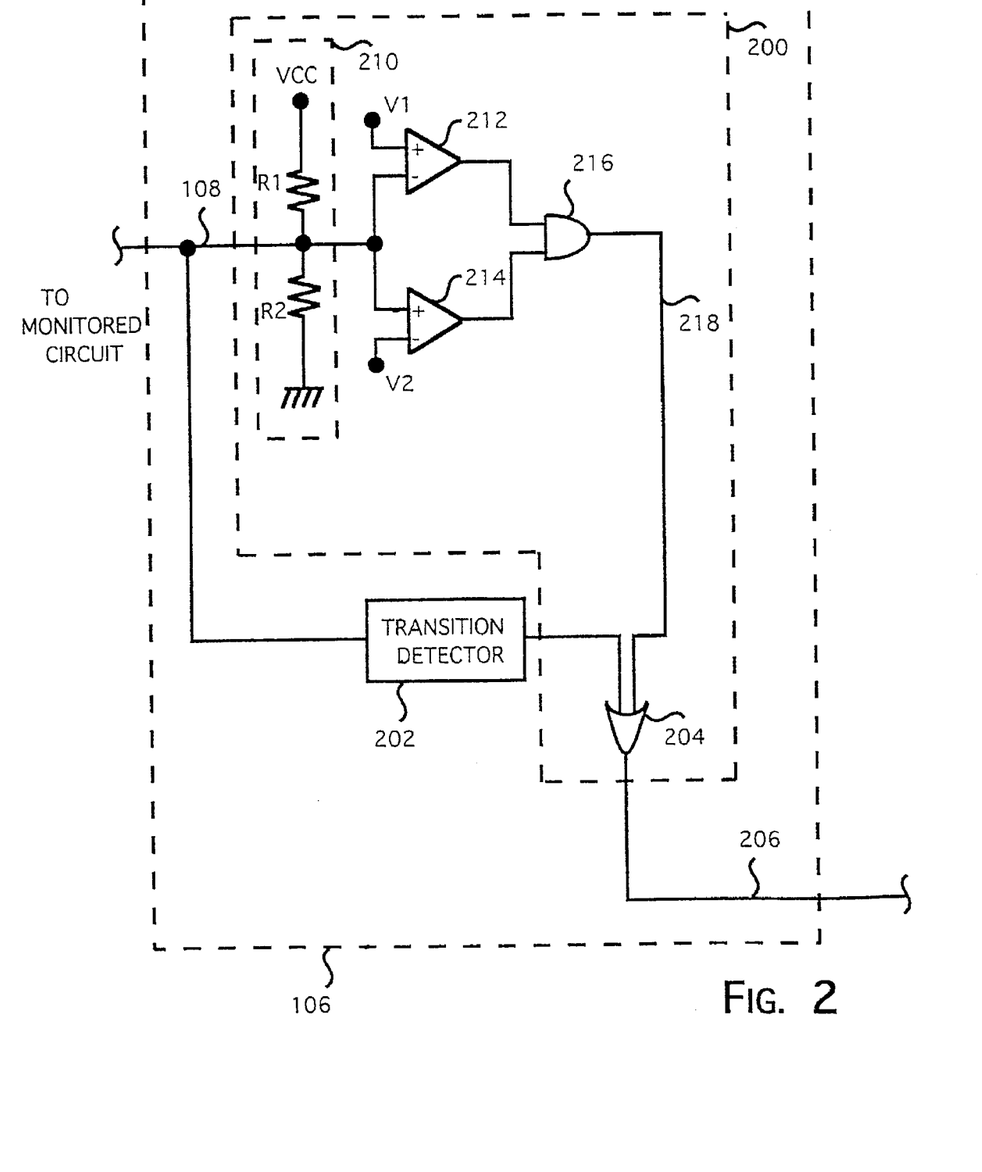
FIG. 2 shows, for illustration purposes, a prior art watchdog disabling circuit.

In the prior art, there exists many schemes for disabling the watchdog function, using a variety of circuits within watchdog circuit 106. FIG. 2 shows, for illustration purposes, a watchdog circuit 106 having a watchdog disabling circuit 200. When watchdog input pin 108 is pulsed by the monitored circuit (not shown in FIG. 2), this externally pulsed signal will be detected by a transition detector circuit 202, whose output is processed via an OR gate 204 to provide a watchdog reset signal on a conductor 206. In the present example, the watchdog circuit is reset when conductor 206 is high. As mentioned earlier, this watchdog reset signal resets the internal watchdog timer in watchdog circuit 106 if watchdog input pin 108 is pulsed before the expiration of the predefined watchdog timeout period.

When the externally pulsed signal is absent, e.g., when monitored circuit 100 is in a sleep mode or monitored circuit 100 causes the I/O pin 110 to become high impedance, the watchdog pin 108 floats and is no longer pulsed by this externally pulsed signal. Since watchdog input 108 now floats, internal voltage divider 210 pulls watchdog input pin 108 to a predefined voltage level. The value of this predefined voltage level depends on the values of resistor R1 and R2 and the respective voltage levels to which these resistors are coupled. In the present example, resistors R1 and R2 are coupled to 5 volt Vcc and ground respectively. Resistor R1 has a value of 320 kΩ, and resistor R2 has a value of 180 kΩ. Together, they cause watchdog input pin 108 to servo to a potential level that is about one-third Vcc.

Comparators 212 and 214 compare the potential at watchdog input pin 108 with reference voltages V1 and V2. Comparators 212 and 214 represent, in one case, simple CMOS inverters that have skewed trip points. In the present example, V1 is at about 2.7 volts, and V2 is at about 1 volt. When the potential level at watchdog input pin is about ⅓ Vcc, comparators 212 and 214 pull the inputs of AND gate 216 high, effectively latching conductor 218 high. In this manner, the watchdog reset signal on conductor 206 is continuously latched high (via OR gate 204), thereby preventing the generation of the watchdog fault condition at the expiration of the predefined watchdog timeout period. As is apparent, the watchdog function is effectively disabled.

Although the watchdog disabling circuit of FIG. 2 accomplishes its purpose, there is room for improvement. For example, when watchdog input 108 floats and is pulled to the above-mentioned predefined voltage level by internal voltage divider 210, current is consumed thorough resistors R1 and R2. In one case, about 10 μA of current is consumed when watchdog input pin 108 floats.

Further, when the operating voltage of the monitored circuit is lowered, e.g., in modem processors that operate at 3.3 volts or even lower, it becomes increasingly difficult to distinguish, via internal voltage divider 210 and comparators 212 and 214, the more closely spaced apart voltage thresholds at the watchdog input pin. For example, to ascertain whether watchdog input pin 108 is at the predefined value (e.g., after being pulled up by internal voltage divider 210), comparators with high tolerances are required when the operating voltage of monitored circuit 100 drops. As is known, comparators that have higher tolerances are more complicated and therefore more difficult to fabricate. In some cases, more sophisticated comparator schemes must be employed to differentiate among the close thresholds. As can be appreciated, this undesirably increases manufacturing complexities and costs.

Figure 3:
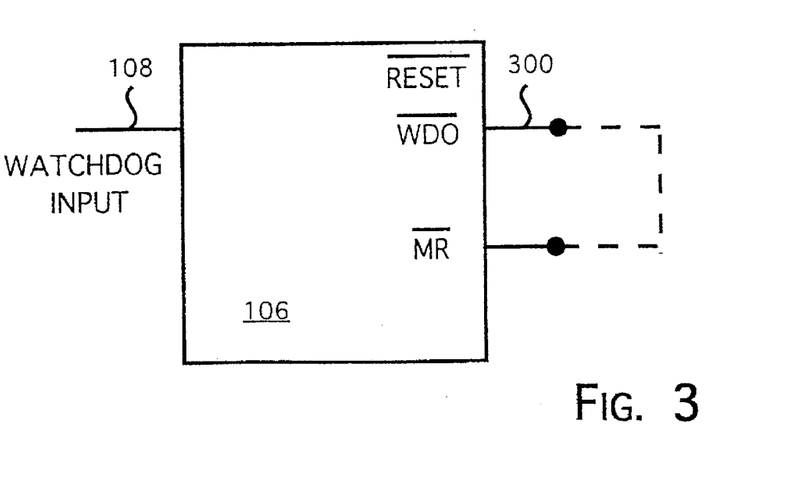
FIG. 3 shows another prior art watchdog circuit, which requires an extra pin to disable its watchdog function.

FIG. 3 shows a watchdog circuit 106 which employs a different watchdog disabling scheme. In FIG. 3, an extra pin 300 is required to disable the watchdog function. Instead of driving the reset signal directly when the watchdog circuit detects the watchdog fault condition, watchdog circuit 106 causes a watchdog out signal to be asserted on pin 300. If this pin 300 is coupled to a manual reset (MR) pin, the assertion of the watchdog out signal will cause the reset signal to be asserted when the watchdog fault condition is generated. However, if pin 300 is disconnected from the manual reset (MR) pin, e.g., by removing a jumper therebetween, the reset signal will not be asserted irrespective whether there exists a watchdog fault condition. When the pin 300 is so disconnected, the watchdog function is disabled.

The extra pin requirement to disable the watchdog function represents a disadvantage of this prior an method. As IC packages become smaller and smaller, fewer pins can be provided per IC chip. As such, pins are at a premium, and it is often not possible to have an extra pin to facilitate the disabling of the watchdog function.

In view of the foregoing, what is desired is improved methods and apparatus for disabling the watchdog function of a watchdog circuit when the circuit it monitors no longer generates an externally pulsed signal. To conserve power, it is further desired that the improved watchdog disabling circuit disable the watchdog function in a power efficient manner.

SUMMARY OF THE INVENTION

The invention relates, in one embodiment, to a method for disabling a watchdog function of a watchdog circuit when a watchdog input pin of the watchdog circuit fails to receive an externally pulsed signal, which has a first predefined period. The watchdog circuit, while the watchdog function is enabled, generates a watchdog fault condition if the externally pulsed signal is not received at the watchdog input pin by the end of a predefined watchdog timeout period.

The method includes the step of providing a pulse generation circuit for generating a pulsed signal having a second predefined period, the second predefined period being shorter than the watchdog timeout period. Further, the method includes the step of coupling a drive circuit to the pulse generation circuit and the watchdog input pin. The drive circuit provides an internally pulsed signal to the watchdog input pin at a predefined current level, responsive to the pulsed signal from the pulse generation circuit. This predefined current level is sufficient to pull the watchdog input pin to a potential level of the internally pulsed signal when the watchdog input pin does not receive the externally pulsed signal. Further, this predefined current level is incapable of pulling the conductor to the potential level of the internally pulsed signal when the watchdog input pin receives the externally pulsed signal.

In another embodiment, the invention relates to an apparatus for determining whether a conductor is coupled to a first circuit. The inventive apparatus includes a pulse generation circuit for generating pulses at predefined intervals. Further, the inventive apparatus includes a drive circuit coupled to the pulse generation circuit and the conductor. In this embodiment, the drive circuit provides an internally pulsed signal to the conductor at a predefined current level, responsive to the pulses from the pulse generation circuit. This predefined current level is sufficient to pull the conductor to a potential level of the internally pulsed signal when the conductor is not coupled to the first circuit. Further, this predefined current level is incapable of pulling the conductor to the potential level of the internally pulsed signal when the conductor is coupled to the first circuit.

In yet another embodiment, the invention relates to an apparatus for disabling a watchdog function of a watchdog circuit when a watchdog input pin of the watchdog circuit fails to receive an externally pulsed signal, which has a first predefined period. The watchdog circuit, while the watchdog function is enabled, generates a watchdog fault condition if the externally pulsed signal is not received at the watchdog input pin by the end of a predefined watchdog timeout period.

The inventive apparatus includes a pulse generation circuit for generating a pulsed signal having a second predefined period, the second predefined period being shorter than the watchdog timeout period. Further, the inventive apparatus includes a drive circuit coupled to the pulse generation circuit and the watchdog input pin. The drive circuit provides an internally pulsed signal to the watchdog input pin at a predefined current level, responsive to the pulsed signal from the pulse generation circuit. This predefined current level is sufficient to pull the watchdog input pin to a potential level of the internally pulsed signal when the watchdog input pin does not receive the externally pulsed signal. Moreover, this predefined current level is incapable of pulling the conductor to the potential level of the internally pulsed signal when the watchdog input pin receives the externally pulsed signal.

BRIEF DESCRIPTION OF THE DRAWINGS

Additional advantages of the invention will become apparent upon reading the following detailed description and upon reference to the drawings, in which.

DETAILED DESCRIPTION OF THE PREFERRED EMBODIMENTS

FIGS. 1–3 illustrates prior an watchdog disabling circuits.

Figure 4:
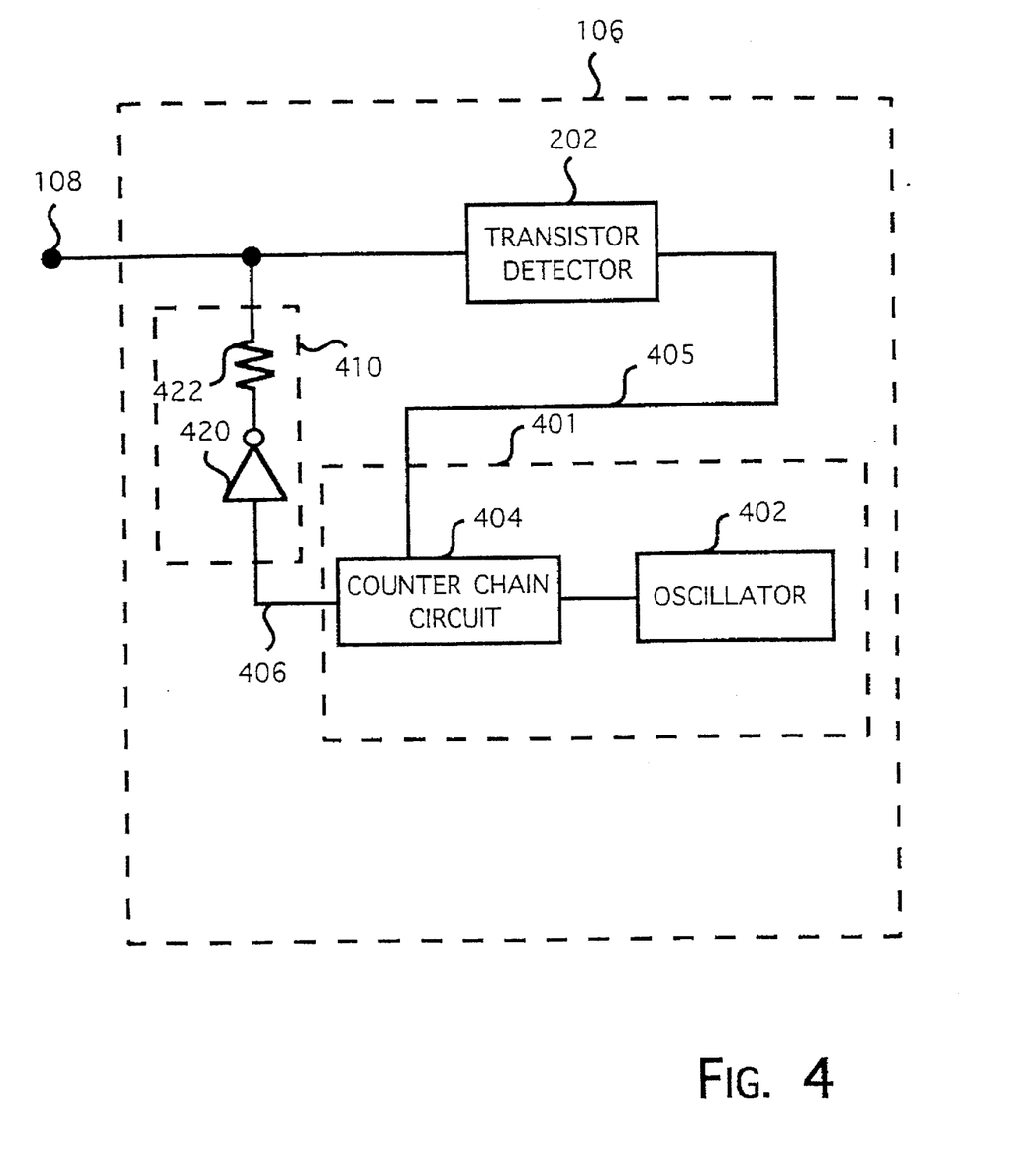
FIG. 4 illustrates a watchdog disabling circuit in accordance with one embodiment of the present invention.

FIG. 4 illustrates a watchdog disabling circuit in accordance with one embodiment of the present invention.

Recalling that the watchdog input pin 108 must be pulsed before the expiration of the predefined watchdog timeout period in order to prevent the generation of a watchdog fault condition, the present invention pulses this pin using a pulse generation circuit that is internal to watchdog circuit 106 itself. As far as the remainder of watchdog circuit 106 is concerned, watchdog input 108 continues to be timely pulsed even when the monitored circuit stops pulsing it from externally.

Referring now to FIG. 4, there is shown a pulse generation circuit 401, which comprises an oscillator circuit 402 and a counter chain circuit 404. Transistion detector 202 generates a reset signal on conductor 405 to reset counter chain circuit 404 when a transition is detected. Oscillator circuit 402 and counter chain circuit 404 represent circuits known in the an for generating a pulsed signal. It should be borne in mind that although the oscillator and counter chain circuits are shown herein for illustration purposes, it is contemplated that pulse generation circuit 401 may be implemented by any known technique for generating pulses at predefined intervals.

In one embodiment, oscillator circuit 402 and counter chain circuit 404 represent the oscillator and counter chain circuits that already existed within watchdog circuit 106 for determining the predefined watchdog timeout period. In one embodiment, the shorter time period of the pulsed signal on conductor 406 may be obtained by tapping from earlier taps in the existing counter chain. This technique is described in greater detail in FIG. 7.

However, the pulsed signal generated by pulse generation circuit 401 to drive conductor 406 preferably has a period that is shorter than the predefined watchdog timeout period. The shorter period of this internally generated pulsed signal advantageously prevents the generation of the watchdog fault condition even in the absence of the externally generated pulsed signal, which is generated by the circuit being monitored.

The pulsed signal generated by pulse generation circuit 401 is input into a drive circuit 410. Responsive to the pulsed signal input, drive circuit 410 provides an internally pulsed signal to watchdog input pin 108. This internally pulsed signal has the same period as the pulsed signal generated by pulse generation circuit 401, albeit with sufficient current to drive watchdog input pin 108 when it is not driven by the circuit being monitored.

In one embodiment, drive circuit 410 is implemented using an inverter 420 in series with a resistor 422. Inverter 420 represents, in one embodiment, a standard CMOS inverter. Resistor 422 functions to limit the current sinked or sourced by inverter 420. This feature is advantageous because if the components of watchdog circuit 106 are implemented on an IC chip, it is typically easier to control the value of resistor 422 than to control the amount of current sinker or sourced by inverter 420.

The strength of the internally pulsed signal provided by driver circuit 410 is preferably sufficiently strong to overcome the potential leakage current of any floating tri-stated gates that may be connected to watchdog input pin 108. Such tri-stated gates may be present in, for example, the monitored processor on which the software executes. In one embodiment, driver circuit 410 preferably sources and sinks about 10 μA to watchdog input pin 108.

However, this internally pulsed signal must not be so strong as to overwhelm the externally pulsed signal, if present, on watchdog input pin 108. To elaborate, when watchdog input pin 108 of watchdog circuit 106 is connected to the monitored processor, e.g., to the microprocessor or microcontroller, and the watchdog function is enabled, an externally pulsed signal is provided to watchdog input pin 108. In this case, the externally pulsed signal output by the monitored processor will override the internally pulsed signal, which is output by the weak drive circuit 410.

Figure 5A:
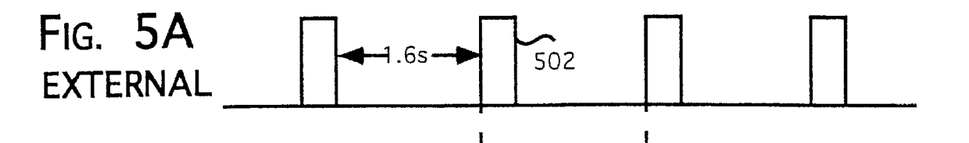
FIGS. 5A–5C illustrate the relationship between the internally pulsed signal and the externally pulsed signal when the externally pulsed signal is present.
Figure 5B:
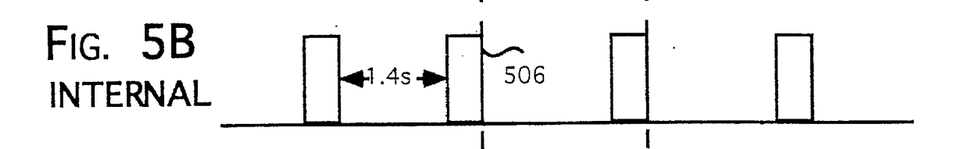
Figure 5C:
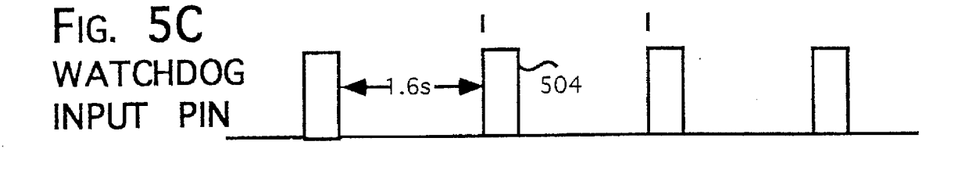

The relationship between the internally pulsed signal and the externally pulsed signal is illustrated in FIGS. 5A–5C. For discussion purposes, the period of the predefined watchdog timeout period is assumed to be 1.8 seconds. The period of the externally pulsed signal is smaller, say at 1.6 seconds, than the predefined watchdog timeout period to prevent the generation of the watchdog fault condition when the externally pulsed signal is present at watchdog input pin 108. This externally pulsed signal is shown in FIG. 5A.

FIG. 5B shows the presence of the internally pulsed signal output by drive circuit 410, which has a period of say 1.4 seconds. It should be borne in mind that the specific values of the watchdog timeout period, the period of the externally pulsed signal, and the period of the internally pulsed signal of the present example are merely illustrative and may vary from application to application. By way of example, they may vary from hundreds of milliseconds (ms) to minutes.

In FIG. 5C, the response of watchdog input pin 108 is shown. Note that when the externally pulsed signal is present, the voltage level of the watchdog input pin follows that of the externally pulsed signal irrespective of the state of the internally pulsed signal. For example, when pulse 502 is present in the externally pulsed signal, watchdog input pin 108 correspondingly follows, as shown by pulse 504. Note that at the moment pulse 502 appears in the externally pulsed signal (as shown in FIG. 5A), the internally pulsed signal is pulling low (as shown in FIG. 5B). However, since the internally pulsed signal is weaker than the externally pulsed signal, the potential level on watchdog input pin 108 follows that of the external signal only when it is present.

Further, the assertion of pulse 506 in the internally pulsed signal does not affect watchdog input pin 108 because this internally pulsed signal is relatively weak and is overwhelmed by the externally pulsed signal, which drives watchdog input pin 108 low at the moment pulse 506 is asserted in the internally pulsed signal of FIG. 5B.

Figure 6A:
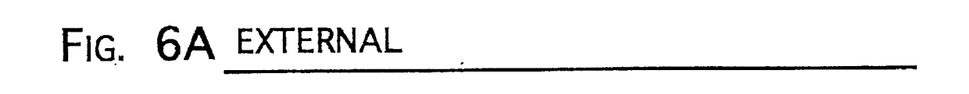
FIGS. 6A–6C illustrate the relationship between the internally pulsed signal and the externally pulsed signal when the externally pulsed signal is absent.
Figure 6B:
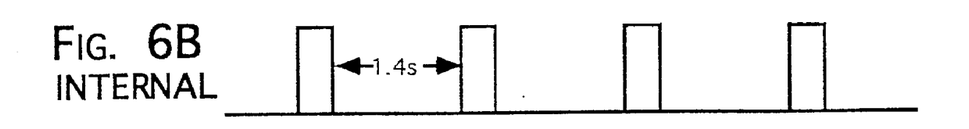
Figure 6C:
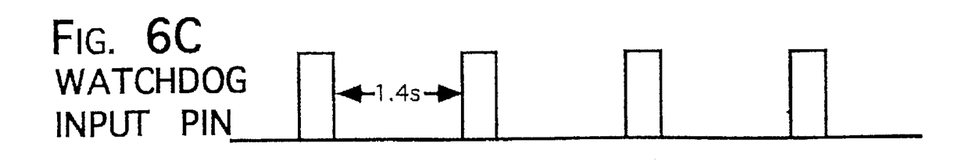

In FIG. 6A, the externally pulsed signal is removed, e.g., when the circuit being monitored is in its sleep mode. In this case, the potential level at watchdog input pin 108 is affected only by the potential level of the internally pulsed signal. In FIGS. 6B and 6C, the potential level at watchdog input pin 108 is shown to substantially correspond with that of the internally pulsed signal.

As is apparent, the internally pulsed signal does not interfere with the externally pulsed signal when the externally pulsed signal is present at watchdog input pin 108. In the absence of the externally pulsed signal, however, the internally pulsed signal acts to prevent the expiration of the watchdog timeout period by timely providing pulses to watchdog input pin 108. In either case, the assertion of the watchdog fault condition is avoided.

Figure 7:
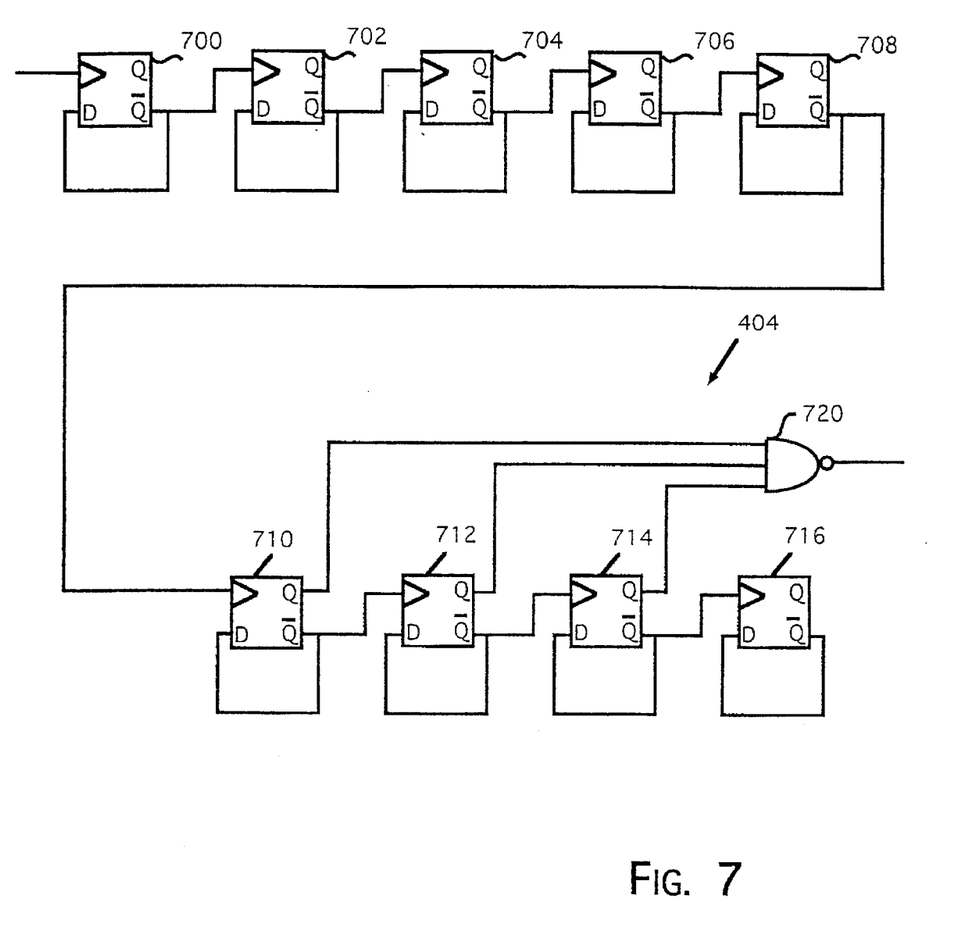
FIG. 7 shows, for illustration purposes, one technique for obtaining a signal having a shorter period from a counter chain circuit, which is also capable of generating a second signal having a longer period.

FIG. 7 shows, for illustration purposes, one technique for obtaining a signal having a shorter period from a counter chain circuit, which is also capable of generating a second signal having a longer period. The technique advantageously allows the same counter chain circuit to generate both the shorter internally pulsed signal period and the longer watchdog timeout period. For illustration purposes, the watchdog timeout period is arbitrarily chosen to be 1.6 seconds, and the period of the internally pulsed signal is arbitrarily chosen to be 1.4 seconds. It should be apparent to those skilled in the art that these values may vary from application to application and that the circuit of FIG. 7 may be modified as appropriate to obtain other values for the periods of the signals.

Referring now to FIG. 7, there are shown 9 flip flops 700–716, which are coupled together in a chain of flip flops. In one embodiment, flip flops 700–716 represent the known D-flip flop. Flip flops 700–708 are divide-by-four flip flops while flip flops 710–716 are divide-by-two flip flops. The output of flip flops 710, 712, and 714 are input into a NAND gate 720 to obtain a signal having a period of about 1.4 seconds. The output of flip flop 716 is used to obtain a signal having a period of about 1.6 seconds.

In the present invention, the elimination of the internal voltage divider advantageously reduces power consumption while the watchdog function is disabled. This power-saving feature is highly desirable in applications wherein reduced power consumption is paramount. By way of example, modern microprocessors and microcontrollers consume on the order of 20 μA. The existence of a watchdog disabling circuit, such as that provided in the prior art, that consumes an appreciable mount of power, say 10 μA, may be unacceptable in certain cases. As a further example, there are applications in which the monitored circuit, e.g., the microprocessor or the microcontroller under supervision by the watchdog circuit, is frequently put in the sleep mode intentionally, thereby consuming negligible amounts of current. In these applications, the ability to disable the watchdog function by a watchdog disabling circuit that consumes little power is highly valuable.

Further, the inventive watchdog disabling circuit advantageously requires no comparators. The elimination of the comparators of the prior art watchdog disabling circuit advantageously reduces manufacturing complexities and costs. Further, the tolerance problem associated with comparators is no longer an issue in the inventive watchdog disabling circuit. Supervisory circuits that employ the inventive watchdog disabling circuit can readily be used with microprocessors or microcontrollers which operate at a reduced operating voltage level Vcc.

Compared to the circuit of FIG. 3, the inventive watchdog disabling circuit advantageously does not require an extra pin to disable its watchdog function. Consequently, it can implemented in a smaller package with fewer pins, advantageously saving space.

Although the watchdog disabling circuit is described herein primarily with reference to supervisory circuits, it is contemplated that the inventive watchdog disabling circuit also have other important applications. For example, the inventive watchdog disabling circuit may be used to detect the floating state of a tri-level input. Tri-level input pins are used in the art to detect signals having three states: high, low, and floating. By using the inventive watchdog disabling circuit, it is possible to detect when such a tri-level input pin is floated by internally pulsing that pin with a weak internally pulsed signal and detect whether such internally pulsed signal significantly affect the potential level of that hi-level input pin. If the hi-level input pin is driven either high or low by an external circuit, the weak internally pulsed signal would be overwhelmed and consequently would not be able to significantly affect the potential level of the tri-level input pin. On the other hand, if such tri-level input pin is floated, that pin will pulse responsive to the weak internally pulsed signal.

As a further example, such watchdog disabling circuits may also be used to detect whether a pin of a device or a conductor is connected to the outside world. In this application, the current level provided by drive circuit 410 is preferably adjusted so that it cannot significantly affect the potential level of the conductor/pin while that conductor/pin is connected to external circuits or devices. If the pin is unconnected, the weak current level supplied by drive circuit 410 would cause that pin to pulse correspondingly, thereby indicating that the pin is unconnected to any other circuit or device.

While this invention has been described in terms of several preferred embodiments, there are alterations, permutations, and equivalents which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for disabling a watchdog function of a watchdog circuit when a watchdog input pin of said watchdog circuit fails to receive an externally pulsed signal having a first predefined period, said watchdog circuit, while said watchdog function is enabled, generates a watchdog fault condition if said externally pulsed signal is not received at said watchdog input pin by the end of a predefined watchdog timeout period, said method comprising:

providing a pulse generation circuit for generating a pulsed signal having a second predefined period, said second predefined period being shorter than said watchdog timeout period; and coupling a drive circuit to said pulse generation circuit and said watchdog input pin, said drive circuit providing an internally pulsed signal to said watchdog input pin at a predefined current level, responsive to said pulsed signal from said pulse generation circuit, said predefined current level being sufficient to pull said watchdog input pin to a potential level of said internally pulsed signal when said watchdog input pin does not receive said externally pulsed signal, said predefined current level being incapable of pulling said conductor to said potential level of said internally pulsed signal when said watchdog input pin receives said externally pulsed signal.

2. The method of claim 1 wherein said step of coupling said drive circuit to said pulse generation circuit and said watchdog input pin comprises:

coupling a resistor to said watchdog input pin; and coupling an inverter between said resistor and said pulse generation circuit.

3. The method of claim 1 wherein said step of providing said pulse generation circuit comprises:

providing an oscillator circuit; and coupling a counter chain circuit to said oscillator circuit.

4. The method of claim 3 wherein said oscillator circuit, said counter chain circuit, and said drive circuit are fabricated on a single integrated circuit chip.

5. The method of claim 3 wherein said counter chain circuit comprises a chain of D flip-flops.

6. The method of claim 5 wherein said watchdog timeout period is ascertained using said counter chain circuit.

7. An apparatus for determining whether a conductor is coupled to a first circuit, comprising:

a pulse generation circuit for generating pulses at predefined intervals; and a drive circuit coupled to said pulse generation circuit and said conductor, said drive circuit providing an internally pulsed signal to said conductor at a predefined current level, responsive to said pulses from said pulse generation circuit, said predefined current level being sufficient to pull said conductor to a potential level of said internally pulsed signal when said conductor is not coupled to said first circuit, said predefined current level being incapable of pulling said conductor to said potential level of said internally pulsed signal when said conductor is coupled to said first circuit.

8. The apparatus of claim 7 wherein said drive circuit comprises an inverter in series with a resistor.

9. The apparatus of claim 7 wherein said pulse generation circuit comprises:

an oscillator circuit; and a counter chain circuit coupled to said oscillator circuit.

10. The apparatus of claim 9 wherein said oscillator circuit, said counter chain circuit, and said drive circuit are fabricated on a single integrated circuit chip.

11. The apparatus of claim 9 wherein said counter chain circuit comprises a chain of D flip-flops.

12. An apparatus for disabling a watchdog function of a watchdog circuit when a watchdog input pin of said watchdog circuit fails to receive an externally pulsed signal having a first predefined period, said watchdog circuit, while said watchdog function is enabled, generates a watchdog fault condition if said externally pulsed signal is not received at said watchdog input pin by the end of a predefined watchdog timeout period, said apparatus comprising:

a pulse generation circuit for generating a pulsed signal having a second predefined period, said second predefined period being shorter than said watchdog timeout period; and a drive circuit coupled to said pulse generation circuit and said watchdog input pin, said drive circuit providing an internally pulsed signal to said watchdog input pin at a predefined current level, responsive to said pulsed signal from said pulse generation circuit, said predefined current level being sufficient to pull said watchdog input pin to a potential level of said internally pulsed signal when said watchdog input pin does not receive said externally pulsed signal, said predefined current level being incapable of pulling said conductor to said potential level of said internally pulsed signal when said watchdog input pin receives said externally pulsed signal.

13. The apparatus of claim 12 wherein said drive circuit comprises an inverter in series with a resistor.

14. The apparatus of claim 12 wherein said pulse generation circuit comprises:

an oscillator circuit;

a counter chain circuit coupled to said oscillator circuit.

15. The apparatus of claim 14 wherein said oscillator circuit, said counter chain circuit, and said drive circuit are fabricated on a single integrated circuit chip.

16. The apparatus of claim 14 wherein said counter chain circuit comprises a chain of D flip-flops.

17. The apparatus of claim 16 wherein said watchdog timeout period is ascertained using said counter chain circuit.

\* \* \* \* \*

UNITED STATES PATENT AND TRADEMARK OFFICE
CERTIFICATE OF CORRECTION

PATENT NO. : 5,649,098
DATED : July 15, 1997
INVENTOR(S) : Sui Ping Shieh, et al.

It is certified that error appears in the above-indentified patent and that said Letters Patent is hereby corrected as shown below:

Column 1, line 35, change "FO to --I/O--
Column 2, line 9, change "1130" to --100--
Column 2, line 43, after "volt" insert --.--
Column 2, line 59, change "modem" to --modern--
Column 3, line 24, change "an" to --art--
Column 4, line 65, change "an" to --art--
Column 5, line 8/9, delete "from externally" after "it"
Column 5, line 55, change "sinker" to --sinked--
Column 7, line 23, change "mount" to --amount--
Column 7, line 58, change "hi-level" to --tri-level--
Column 7, line 59, change "hi-level to --tri-level--

Signed and Sealed this

Second Day of December, 1997

Attest:

BRUCE LEHMAN

Attesting Officer

Commissioner of Patents and Trademarks